Figure 1:
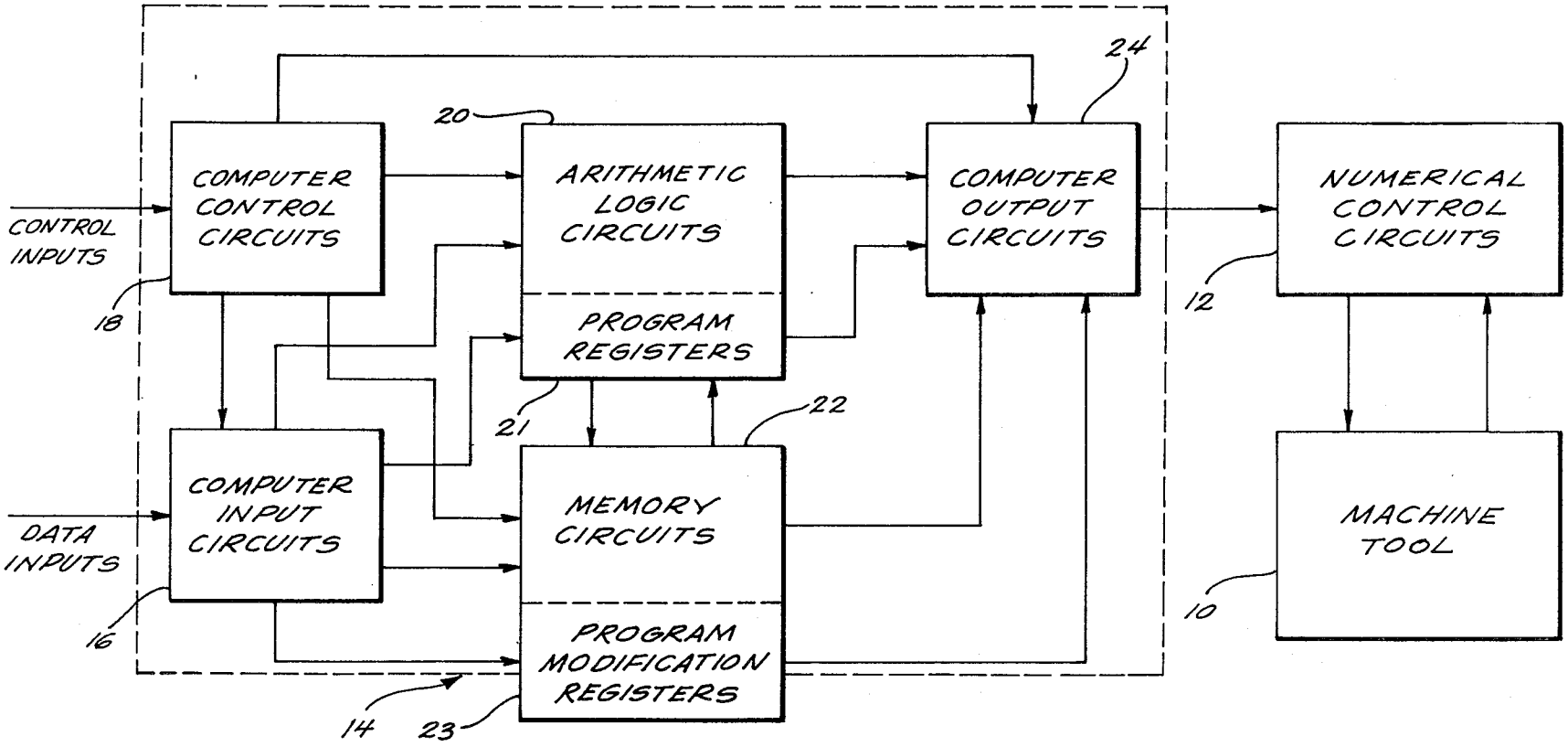
Figure 2:
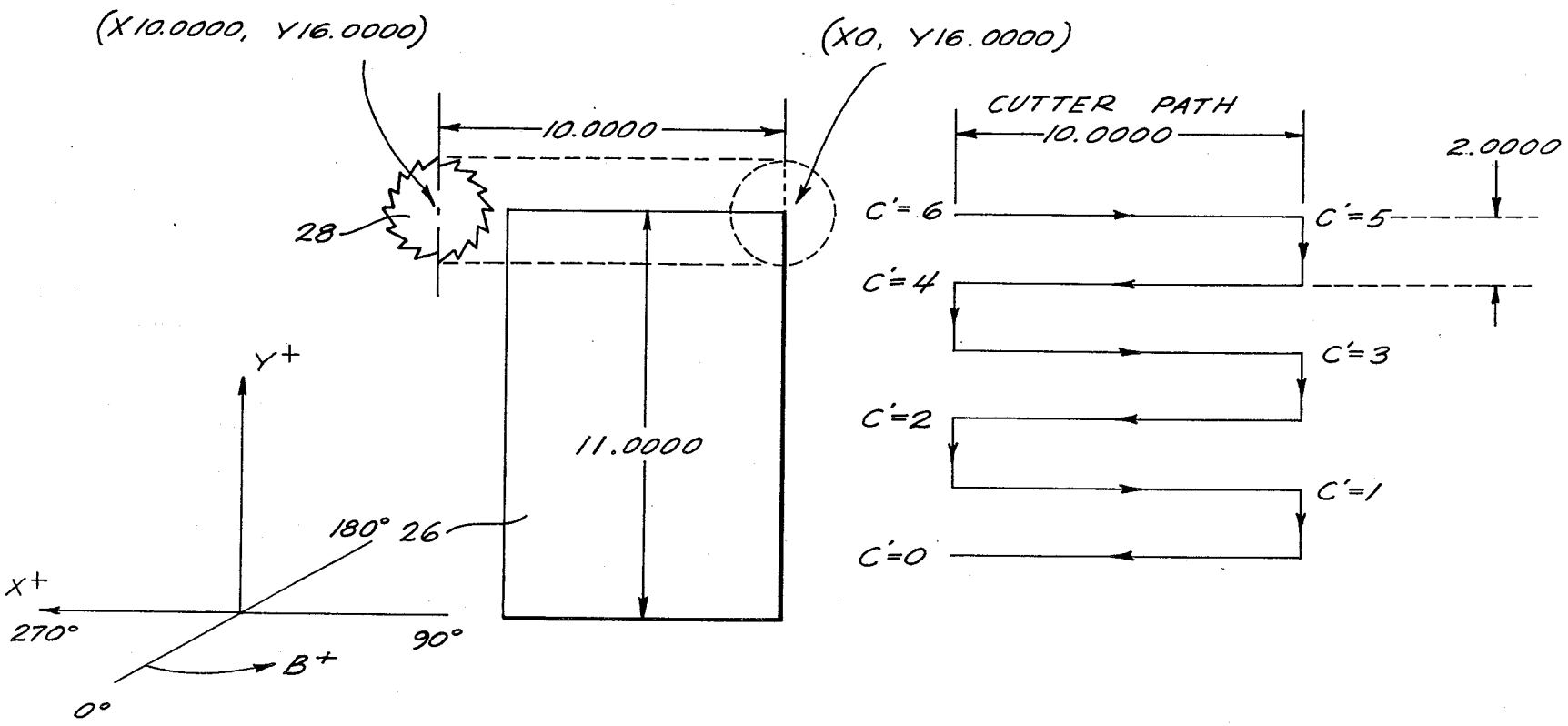

United States Defensive Publication [19] (H) [11] T977,007

Selander [43] Dec. 5, 1978

[54] PROGRAM MODIFICATION REGISTERS FOR NUMERICALLY CONTROLLED MACHINE TOOLS

[75] Inventor: Douglas S. Selander, New Berlin, Wis.

[73] Assignee: Kearney & Trecker Corporation, West Allis, Wis.

[21] Appl. No.: 874,340

[22] Filed: Feb. 1, 1978

[51] Int. Cl.[2] ..... G06F 15/46

[52] U.S. Cl. ..... 364/474

[57] ABSTRACT

By utilizing a set of program modification registers, a numerically controlled machining program can be written with loops and branches like a computer program. The order and action of the program blocks can be made dependent upon data contained in the program modification registers. The register data may be altered by the program as it runs or by external inputs to the control circuits.

2 Claims, 2 Sheets Drawing,

7 Pages Specification

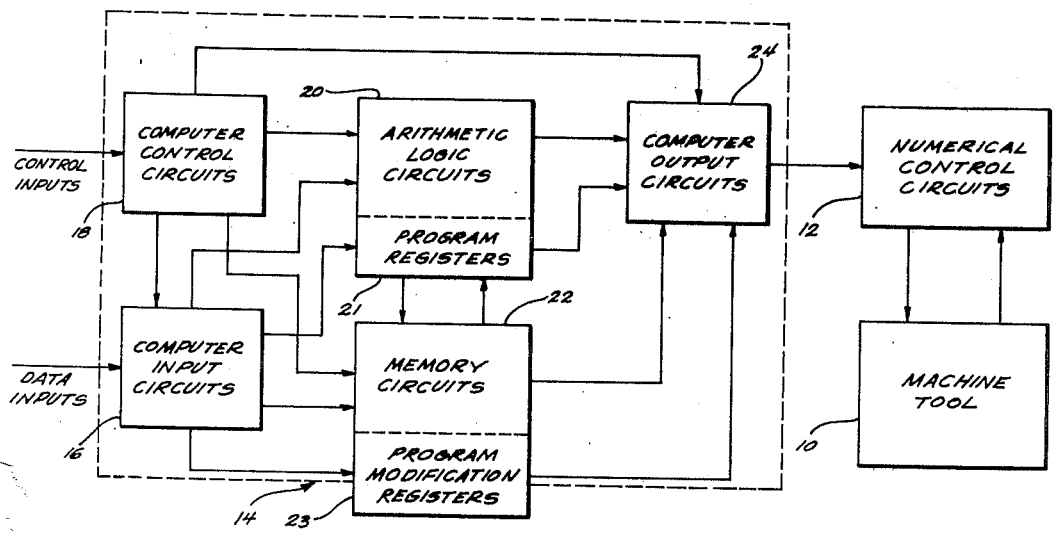

The file of this unexamined application may be inspected and copies thereof may be purchased (849 O.G. 1221, Apr. 9, 1968).